US010058927B2

(12) United States Patent
Mihailovic

(10) Patent No.: US 10,058,927 B2
(45) Date of Patent: Aug. 28, 2018

(54) SPINDLE CLAMP FOR TOOL HOLDER

(71) Applicant: Mince Master Inc., Chicago, IL (US)

(72) Inventor: Vladan Mihailovic, Long Grove, IL (US)

(73) Assignee: Mince Master Inc., Chicago, IL (US)

( * ) Notice: Subject to any disclaimer, the term of this patent is extended or adjusted under 35 U.S.C. 154(b) by 0 days.

(21) Appl. No.: 15/423,783

(22) Filed: Feb. 3, 2017

(65) Prior Publication Data

US 2017/0225237 A1 Aug. 10, 2017

Related U.S. Application Data

(60) Provisional application No. 62/291,401, filed on Feb. 4, 2016.

(51) Int. Cl.
*B23B 31/26* (2006.01)
*B23Q 3/155* (2006.01)

(52) U.S. Cl.
CPC ........ *B23B 31/261* (2013.01); *B23Q 3/15553* (2013.01); *B23B 31/265* (2013.01); *B23B 2270/22* (2013.01); *Y10T 279/17231* (2015.01); *Y10T 279/17769* (2015.01); *Y10T 279/18* (2015.01); *Y10T 279/185* (2015.01); *Y10T 409/309464* (2015.01)

(58) Field of Classification Search
CPC ..... B23B 31/26; B23B 31/261; B23B 31/265; Y10T 279/17231; Y10T 279/17769; Y10T 279/18; Y10T 279/185
See application file for complete search history.

(56) References Cited

U.S. PATENT DOCUMENTS

| 2,939,643 | A | * | 6/1960 | Barsam, Jr. | ............ | G03B 21/43 |
| | | | | | | 242/545 |
| 3,271,853 | A | | 9/1966 | Pfister | | |
| 3,372,951 | A | * | 3/1968 | McCash | ................ | B23B 31/261 |
| | | | | | | 403/349 |
| 3,599,996 | A | * | 8/1971 | Holt | ........................ | B23B 31/18 |
| | | | | | | 279/37 |
| 3,791,257 | A | * | 2/1974 | Frazier | .................... | B23B 31/26 |
| | | | | | | 279/900 |

(Continued)

*Primary Examiner* — Daniel Howell
*Assistant Examiner* — Yasir Diab
(74) *Attorney, Agent, or Firm* — Erickson Law Group, PC

(57) ABSTRACT

A machine tool clamping device for releasably holding a tool holder having a tapered shank and a knob protruding from the tapered shank, the clamping device having: a spindle, rotatable about an axis, and having a tapered socket at a lower end thereof and an axial passage, the tapered socket being complementary in shape to the shank of a tool holder. Clamping members are pinned to the spindle and extend into the axial passage, the clamping members being pivotal between a clamped position in which the clamping members clamp the tool holder knob, and an unclamped position in which the clamping members release the tool holder knob. A drawbar is slidable within the spindle axial passage between the clamping members, the drawbar having a surface that acts to pivot the clamping members between the clamped and unclamped positions depending on the position of the drawbar within the axial passage. A spring is arranged between the drawbar and the spindle to bias the drawbar to the clamped position.

16 Claims, 2 Drawing Sheets

(56) References Cited

U.S. PATENT DOCUMENTS

| | | | |
|---|---|---|---|
| 4,604,009 A * | 8/1986 | Tennerstedt | B23B 29/046 279/37 |
| 5,730,562 A | 3/1998 | Matsumoto et al. | |
| 6,135,461 A * | 10/2000 | Below | B25D 17/088 279/19.4 |
| 6,234,731 B1 | 5/2001 | Sakamoto | |
| 6,287,059 B1 | 9/2001 | Hashidate et al. | |
| 7,281,331 B1 * | 10/2007 | Stutsman | B23B 31/265 29/434 |
| 7,284,938 B1 | 10/2007 | Miyazawa | |
| 7,367,097 B2 | 5/2008 | Nakamura et al. | |
| 8,066,456 B2 | 11/2011 | Mohr et al. | |
| 8,376,670 B2 | 2/2013 | Shinano | |
| 8,403,338 B2 | 3/2013 | Hangleiter | |
| 8,556,554 B2 | 10/2013 | Hangleiter | |
| 2005/0220556 A1 * | 10/2005 | Takase | B23B 31/263 409/233 |
| 2005/0232720 A1 * | 10/2005 | Lu | B23B 31/265 409/233 |

\* cited by examiner

SPINDLE CLAMP FOR TOOL HOLDER

This application claims the benefit of U.S. Provisional Application 62/291,401, filed Feb. 4, 2016.

BACKGROUND

The present invention relates to a machine tool. More particularly, the invention relates to a clamping device for holding a tool holder securely to a hollow rotating spindle.

Tapered shank tool holders have a knob on a top end. A bit or other tool is fixedly held in the tool holder. The tool holder is releasably held within a tapered socket of a hollow rotating spindle driven by the machine tool.

The spindle has an axial channel open into the tapered socket. Collet fingers are captured within the channel. The collet fingers are actuated to move and turn within the axial channel to grip the tool holder knob. A draw bar slidable within the axial channel is engaged to the collet fingers. Depending on the axial position of the draw bar in the axial channel, the collet fingers are either in the knob-gripping clamped position or the knob-releasing unclamped position.

A plurality of springs, in the form of Bellville washers securely hold the tool holder in the spindle tapered socket by urging the draw bar to turn the collet fingers in the clamping position. The knob held by the collet fingers is pulled upward into the operating position, and the tapered shank is tightly fit into the tapered socket.

To release the tool holder from the clamped position in the spindle, pressurized hydraulic or pneumatic fluid is applied within a cylinder to act on a piston connected to the drawbar. The fluid forces the drawbar downward against the urging of the Bellville washers to unclamp the tool holder. When a new tool holder is to be installed, to return the collet to the clamping position, the fluid pressure is released. The Bellville washers snap the drawbar back to the clamping position to clamp the knob on the new tool holder.

U.S. Pat. No. 3,271,853 describes a tool holder having a head that is captured by two pivoting gripping members. The gripping members are pivoted about centers thereof by pins and are opened and closed by cam surfaces on an outside surface.

U.S. Pat. No. 3,791,257 describes jaw members that are pivoted open and closed. These jaw members engage a socketed portion of a tool holder.

U.S. Pat. Nos. 8,556,554; 8,403,338; 8,376,670; 8,066,456; 7,367,097; 7,284,938; 6,287,059; 6,234,731; 5,730,562 all describe tool holder head-engaging mechanisms. However, these engaging mechanisms are in the form of collets or chucks that use the vertical sliding of a drawbar to position collet portions beneath the spindle head of the tool holder.

The present inventor has recognized that collet designs can suffer the drawback that with enough force on the tool by the workpiece being machined, the tool holder can move in the tapered socket. To prevent this movement the spring force by the Bellville washers must be high. When the pressure is released from the pressurized fluid during a tool holder clamping operation, the Bellville washers tend to collide the tool holder into the tapered socket with an undesirable impact.

The present inventor has recognized that the spindle ball bearings are adversely affected by the impact caused by the engagement of the clamping mechanism on release of the air or hydraulic pressure. The drawbar is raised rapidly by the Bellville washers and the reaction force or impact between the tool holder and the spindle is transferred through the ball bearings into the machine tool. The release and clamping of tool holders can occur many times per day, possibly a thousand times, and the repetitive impact on the ball bearings can shorten the life of the ball bearings.

The present inventor has recognized that it would be advantageous to provide a clamping arrangement for a tool holder that resists movement between the tool holder with the spindle at even great forces from the workpiece. The present inventor has recognized that it would be advantageous to provide a clamping arrangement for a tool holder that was effective to reduce needed spring force to preserve spindle bearings, which are expensive.

SUMMARY

An embodiment of the present invention provides a clamping device which reliably holds a tool holder to a machine tool spindle. The embodiment of the present invention provides a clamping device that holds the tool holder to a hollow spindle with a more reliable and secure engagement than a collet or collet fingers.

The invention provides a machine tool clamping device, which holds a tool holder having a knob onto a hollow spindle having an axial shaft passage in such a way that it can be positively locked and released. The embodiment provides clamping members that are pinned inside the hollow spindle to pivot between a clamped and unclamped orientation. The clamping members are outwardly curved and are pinned at central locations thereof. Upper portions of the clamped members are spread apart by a reverse taper on the draw bar as it is raised, causing lower portions of the clamping members to pinch together beneath the knob or head of the tool holder.

The curved profile of the clamping members provide for a decrease in stress within the clamping members during clamping, and eliminates sliding friction otherwise present in sliding and turning collet fingers. A strong holding force is accommodated by the pinned connection of the clamped members.

The interaction between the drawbar and the clamping members provides a positive locking between the tool holder and the spindle that allows for a reduced spring force on the drawbar to actuate the clamping operation. This in turn allows for a lower hydraulic or pneumatic pressure to move the drawbar downward to unclamp a tool holder from the spindle. These reduced clamping and unclamping forces reduce the stresses caused by the impact on the drawbar and spindle, on the ball bearings and increase spindle bearing life.

Numerous other advantages and features of the present invention will be become readily apparent from the following detailed description of the invention and the embodiments thereof, and from the accompanying drawings.

DETAILED DESCRIPTION

Figure 1:
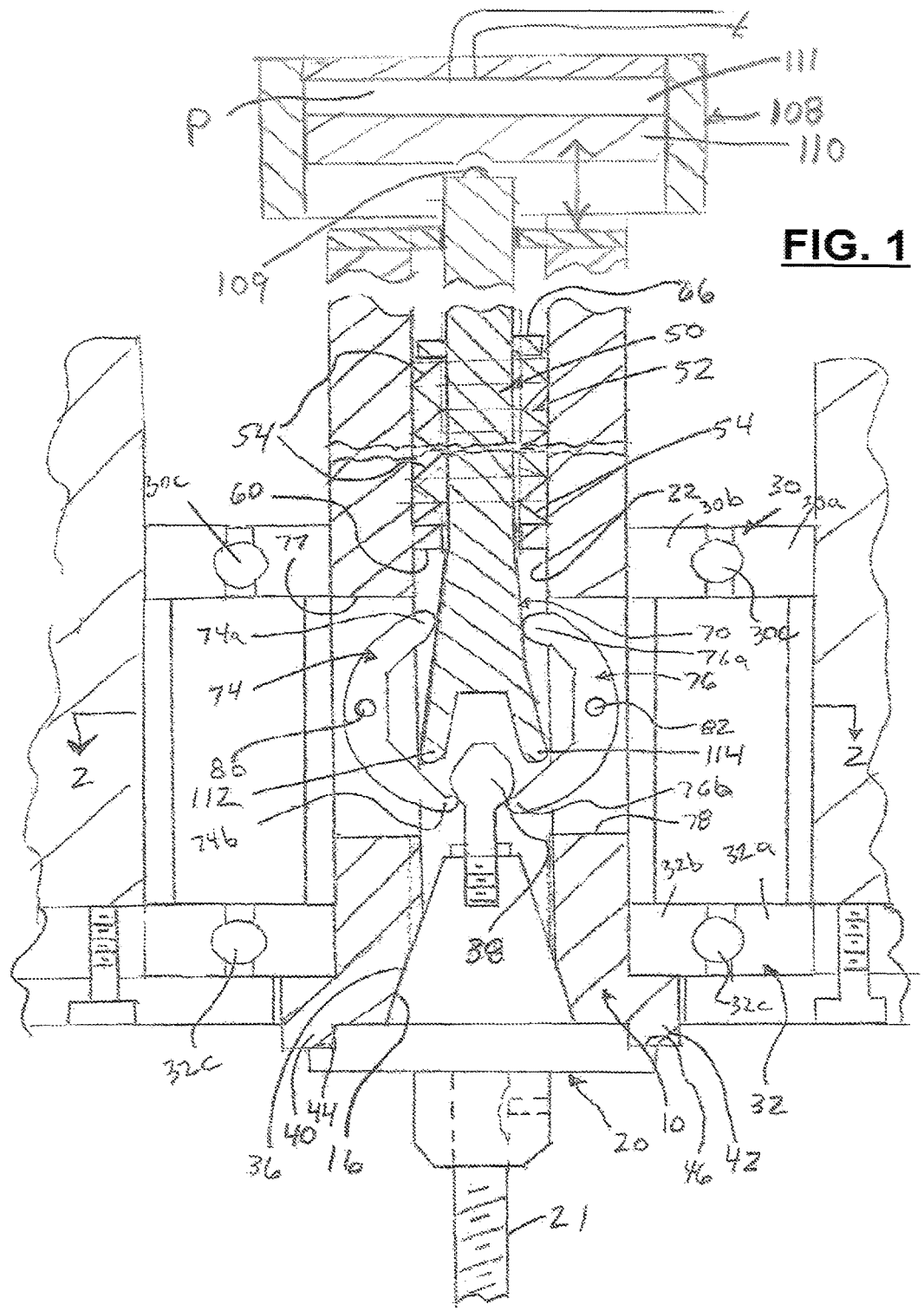
FIG. 1 is a vertical section illustrating a clamping device according to the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

An exemplary embodiment of a clamping device provides a hollow cylindrical spindle 10 having a tapered socket 16 formed on one end thereof which holds a tapered shank tool holder 20. The tool holder holds a tool, such as a bit 21. The spindle 10 is driven in rotation by a motor M, which drives the tool holder 20 and the tool 21 to do work on a workpiece.

The spindle 10 has an axial passage 22 open to the tapered socket 16. The spindle 10 is supported for rotation by upper and lower annular bearings 30 and 32. The upper bearing 30 includes a stationary annular race 30a, a rotating annular race 30b and a plurality of ball bearings 30c between the races 30a, 30b. The lower bearing 32 includes a stationary annular race 32a, a rotating annular race 32b and a plurality of ball bearings 32c between the races 32a, 32b. The tapered shank tool holder 20 has a tapered shank 36 which is complementary to the tapered socket 16, and a knob 38 which protrudes from the tapered end thereof. Furthermore, the spindle 10 has two keys 40, 42 which fit into two key channels 44, 46 on the tapered shank tool holder 20. The keys are formed on the perimeter edge of the opening in tapered socket 16.

A drawbar 50 is arranged slidable vertically within the passage 22 of the spindle 10. The drawbar 50 is surrounded by a spring 52 may comprise a stack of Belleville spring washers 54. Other types of springs, such as a coil spring, are encompassed by the present invention. A ring 60 that is fixed to the spindle 10 supports the spring which urges against a ring 66 fixed to the drawbar 50, thus urging the drawbar 50 upward with respect to the spindle 10. The drawbar 50 has a reverse tapered bottom region 70.

Two clamping members 74, 76 are located within windows 77, 78 formed through the side wall of the spindle 10. The clamping members 74, 76 are pivoted at pins 80, 82 at central areas thereof to the spindle 10 in the windows 77, 78, to pivot or rotate about horizontal axes. Upper end portions 74a, 76a of each clamp element face the drawbar 50 and are in sliding contact with the drawbar. The clamping members 74, 76 are curved with lower end portions 74b, 76b extending inward to underlie the knob 38 of the tool holder 20 when in the clamped orientation.

A cylinder 108 is provided above the spindle 10. The draw bar 50 has a top end 109 extending above the spindle 10 and below the cylinder 108. The cylinder 108 includes a piston 110 slidable therein. The cylinder 108 receives hydraulic or pneumatic fluid P under pressure into a chamber 111 to move the piston 110 downward against the top end 109 of the drawbar 50 to force the drawbar 50 downward with respect to the spindle 10 against the urging of the spring 52.

When the drawbar 50 is moved downward against the urging of the spring 52, lowest portions 112, 114 of the drawbar 50 contact and force apart the lower end portions 74b, 76b of the clamping members as the clamping members 74, 76 pivot about the pins 80, 82. At the same time, the upper end portions 74a, 76a move inwardly as the clamping members 74, 76 pivot about the pins 80, 82 as the reverse taper of the drawbar region 70 narrows. As the lower end portions 74b, 76b of the clamping members separate, the knob 38 escapes the grasp of the clamping members 74, 76, and the tool holder 20 disengages from the spindle 10.

Although two clamping members are shown arranged at 180 degrees across a center axis of the drawbar, three clamping members arranged at 120 degrees spacing around the center axis of the drawbar. Other numbers of clamping members could also be used.

The clamping members 74, 76 are advantageously curved to reduce internal stress on the clamping members 74, 76 under clamping pressure.

Figure 2:
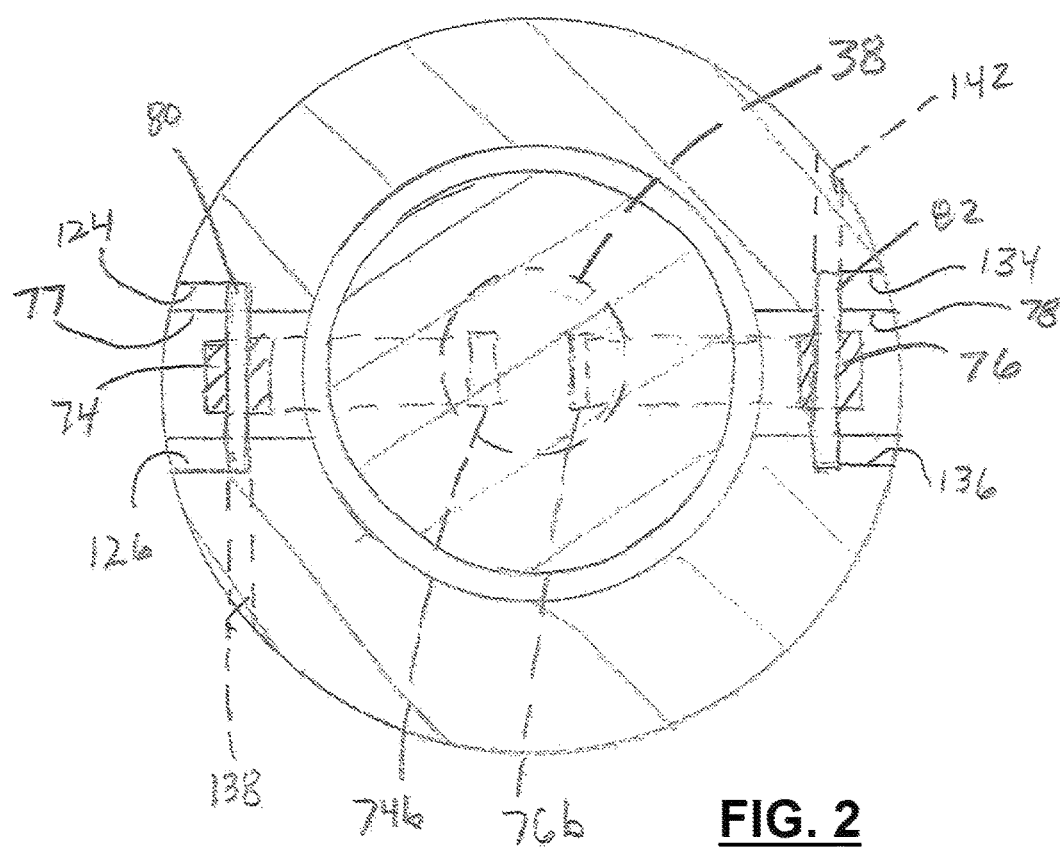
FIG. 2 is a fragmentary sectional view taken generally along line 2-2 of FIG. 1, with some portions removed for clarity.

FIG. 2 shows in section the clamping members 74, 76 being diametrically opposed across the spindle 10. During assembly, the pins 80, 82 that pivotally mount the clamping members 74, 76 can be fitted into the windows by way of radial slots 124, 126, 134, 136 extending from an outside of the spindle 10 inwardly to the position of mounting of the pins 80, 82. The pins 80, 82 can be fixed into the slots 124, 126, 134, 136 by plugs or by welding, or other known means. Alternately, the pins can be pushed through tangential bores 138, 142 to be also pushed through the clamping members 74, 76, prepositioned in the windows 77, 78.

The clamping members 74,76 provide a positive locking of the tool holder to the spindle as the upper portions 74a, 76a of the clamping members are braced against the drawbar to prevent any movement, and the lower portions 74b, 76b are braced under and against the knob 38 of the tool holder. The reaction forces on the clamping members are taken up by the pins 80, 82.

Although the spring 52 is shown to create a clamping force on the clamping members to lock the tool holder to the spindle, it is also possible that instead of a spring, pneumatic or hydraulic pressure could be used against a piston to create the clamping force on the clamping members to lock the tool holder to the spindle. Alternately, a solenoid created force or a magnetic force could be used to create the clamping force on the clamping members to lock the tool holder to the spindle. Due to the positive locking of the clamping members, a reduced clamping force would be needed to mechanically lock the tool holder to the spindle.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A machine tool clamping device for releasably holding a tool holder having a tapered shank and a knob protruding from the tapered shank, the clamping device comprising:
   a spindle, rotatable about an axis, and having a tapered socket at a lower end thereof and an axial passage, the tapered socket being complementary in shape to the shank of a tool holder;
   clamping members pinned to the spindle and extending into the axial passage, the clamping members being pivotal between a clamped position in which the clamping members clamp the tool holder knob, and an unclamped position in which the clamping members release the tool holder knob; and
   a drawbar slidable within the spindle axial passage between the clamping members, the drawbar having a surface that acts to pivot the clamping members between the clamped and unclamped positions depending on the position of the drawbar within the axial passage.

2. The clamping device according to claim 1, further comprising a spring arranged between the drawbar and the spindle to bias the drawbar to the clamped position.

3. The clamping device according to claim 1, wherein the clamping members are arranged spaced apart at 180 degrees about the spindle axis, each of the clamping members having a lower end that includes a hook portion having a radially inwardly extending member for clamping the tool holder knob.

4. The clamping device according to claim 1, wherein the clamping members are curved outwardly from top ends to bottom ends.

5. The clamping device according to claim 1, wherein the clamping members are curved in a semicircular shape.

6. A machine tool clamping arrangement, for holding a tool holder onto a hollow spindle, for tool holder having a head, the hollow spindle having an axial shaft passage; clamping members that are pinned to the hollow spindle and are located at least partially inside the hollow spindle to pivot between a clamped and unclamped orientation, the clamping members being outwardly curved and being pinned by pins at central locations of the clamping members to the hollow spindle, wherein upper portions of the clamping members are arranged to be spread apart by a reverse taper on a draw bar as it is raised, causing lower portions of the clamping members to pinch together to be positionable beneath the head of the tool holder.

7. The machine tool arrangement of claim 6, wherein the hollow spindle has windows through a sidewall of the hollow spindle, and the pins that pin the clamping members to the hollow spindle are each fit in a radial direction into a respective window by way of pin-receiving slots formed in the hollow spindle on opposing sides of each window.

8. The machine tool arrangement of claim 6, wherein a spring is fit between the hollow spindle and a drawbar to create a clamping force on the clamping members via movement of the drawbar to lock the tool holder to the spindle.

9. The machine tool arrangement of claim 6, wherein the drawbar has a ring fixed on an upper portion thereof and the hollow spindle has a ring fixed on the spindle and spaced apart from the drawbar ring, and the spring is arranged between the two rings, surrounding the drawbar and urging the drawbar to cause the reverse taper on a reverse tapered end of the drawbar to spread the top ends of the clamping members and pinch the bottom ends of the clamping members toward each other to urge the tool holder tightly into the spindle.

10. The machine tool arrangement of claim 9, wherein the spring comprises a stack of spring washers.

11. The machine tool arrangement of claim 6, wherein the tool holder has a head, and the clamping members provide a positive locking of the tool holder to the spindle as the upper portions of the clamping members are braced against the drawbar to prevent any movement, and the lower portions are braced under and against the head of the tool holder.

12. The machine tool clamping device according to claim 1, wherein the drawbar comprises a reverse tapered bottom region having said surface.

13. The clamping device according to claim 12, further comprising a spring arranged between the drawbar and the spindle to bias the drawbar to the clamped position.

14. The clamping device according to claim 12, wherein the clamping members are arranged spaced apart about the spindle axis, each of the clamping members having a lower end that includes a hook portion having a radially inwardly extending member for clamping the tool holder knob.

15. The clamping device according to claim 12, wherein the clamping members are curved outwardly from top ends to bottom ends.

16. The clamping device according to claim 15, wherein the clamping members are curved in a semicircular shape.

* * * * *